July 16, 1968     H. MAGEE     3,393,003
ATTACHING DEVICE FOR FLEXIBLE ELECTRIC CONDUIT
Filed July 25, 1966
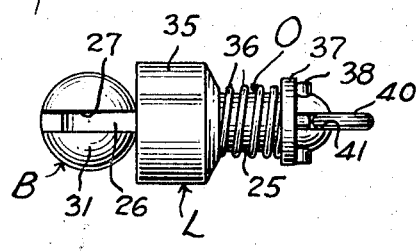
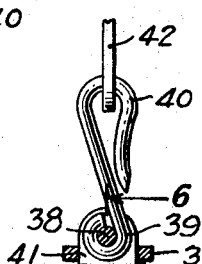
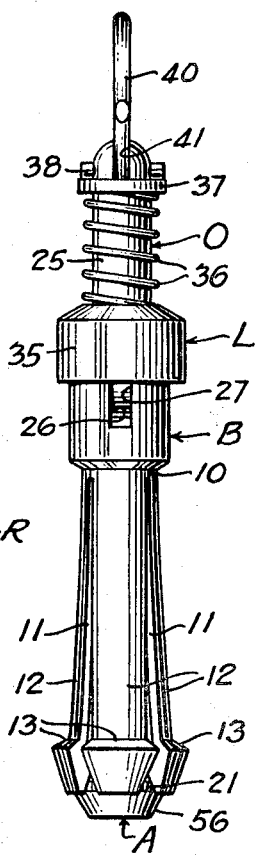
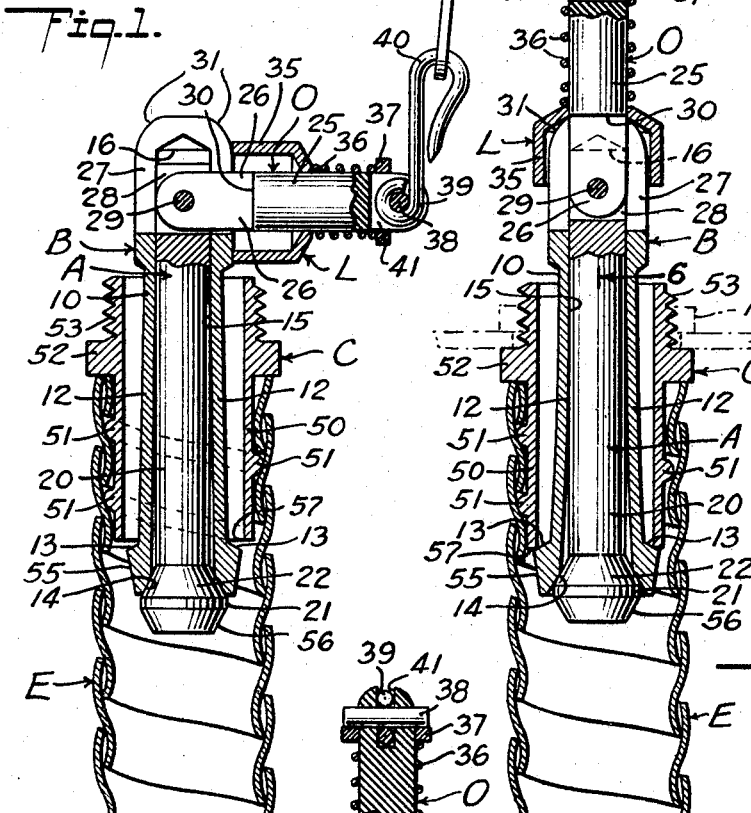
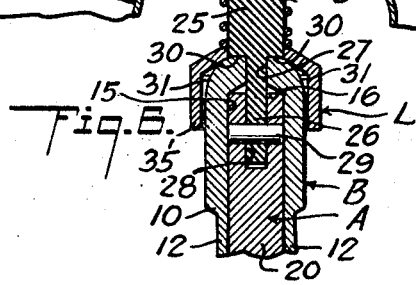
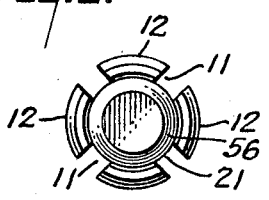
INVENTOR
HAROLD MAGEE
BY
Frederick Diehl
ATTORNEY

United States Patent Office 3,393,003
Patented July 16, 1968

3,393,003
ATTACHING DEVICE FOR FLEXIBLE ELECTRIC CONDUIT
Harold Magee, 3247 Drew St., Los Angeles, Calif. 90065
Filed July 25, 1966, Ser. No. 567,558
4 Claims. (Cl. 294—96)

ABSTRACT OF THE DISCLOSURE

This invention provides a device which can be detachable secured to a flexible metallic electric conduit by utilizing a standard connector screwed into the conduit and forming an annular shoulder with which the device co-acts to enable the conduit to be drawn by a suitable fishing line attached to the device, through a wall space from a point beneath the floor or above the ceiling of a room to a wall opening or receptacle therein, all to the end of facilitating and expediting the installation of the conduit.

---

My invention relates generally to electric wiring systems and more particularly to the installation of flexible metallic conduit in closed wall spaces of existing building structures to provide for additional circuits to wall receptacles and other types of electric outlets.

An object of my invention is to provide an attaching device of simple, compact and rugged construction which is structurally characterized by means enabling it to be detachably secured to a flexible metallic conduit by preferably, although not necessarily utilizing an internal annular shoulder formed in the conduit by a connector of standard manufacture screwed into the conduit, all in such manner as to materially facilitate and expedite the operation of pulling the conduit through the wall space from a point beneath the floor or above the ceiling to a knockout opening in a wall receptacle or to an opening in the wall for such a receptacle, with a suitable fishing line such as a ball type chain detachably secured to the attaching device.

Another object of my invention is to provide an attaching device for flexible electrical conduit of the above described character which can be engaged with and locked to the standard connector in the conduit with the utmost ease and dispatch, and can be instantly disengaged from the connector following the pulling of the conduit to the wall receptacle or opening therefor, to the end of saving considerable time with the attendant reduction in the cost of the job.

With these and other objects in view, my invention resides in the combinations, arrangements and functional relationships of elements as set forth in the following specification and particularly pointed out in the appended claims.

In the accompanying drawings,

FIGURE 1 is a longitudinal axial sectional xiew of one form of attaching device embodying my invention and showing the device in its collapsed or released position and inserted into the connector of a flexible conduit for engagement with the connector;

FIGURE 2 is a plan view of the attaching device as shown in FIGURE 1;

FIGURE 3 is a view similar to FIGURE 1 and illustrating the attaching device in its expanded position and engaged with and locked to the connector in the conduit preparatory to pulling the conduit through a wall space;

FIGURE 4 is a view of the attaching device in side elevation and expanded as in FIGURE 3;

FIGURE 5 is an end view of the attaching device as shown in FIGURE 4; and

FIGURE 6 is a fragmentary longitudinal sectional view of the attaching device taken on the line 6—6 of FIGURE 3.

Referring specifically to the drawings, my invention in its illustrated embodiment comprises an elongated body B in the form of a relatively thin-wall tube 10 which is provided with longitudinal slots 11 at equally spaced locations circumferentially. These slots extend from one end of the body to define a plurality of resilient members or arms 12 self-urged to the collapsed or released position shown in FIGURE 1. Four arms 12 are shown in the present instance although a greater or lesser number can be used. The free ends of the arms 12 are formed externally with radially extending arcuate projections or latching shoulders 13, and are flared or beveled internally as indicated by 14.

Slidably mounted in the bore 15 of the tube 10 which terminates in spaced relation to the other end of the tube to provide a load sustaining stop 16, is an actuator A. The actuator A is in the form of a cylindrical rod or pin 20 provided at its outer end with a cylindrical head 21 one portion of which is flared or beveled to define a peripheral cam 22 co-acting with the bevels 14 of the arms 12 to move the latter to the expanded position shown in FIGURE 3 when the actuator is moved axially in the tube 10 from the position shown in FIGURE 1 to the position shown in FIGURE 3.

An operating member O in the form of a cylindrical lever 25 has one end flattened to provide a tongue 26 which extends through slots 27 and 28 formed by bifurcating the ends of the tube 10 and rod 20, repectively. A pin 29 extending through the bifurcated end of the rod 20 and through the tongue 26 pivotally connects the operating member O to the actuator A.

At the juncture of the tongue 26 and the cylindrical portion of the lever 25 are formed operating surfaces 30 which, upon 90 degree movement of the member O from the laterally projecting or released position shown in FIGURE 1 to the alined or locked position shown in FIGURE 3, ride over a cam 31 formed by the rounded end of the tube 10, to move the actuator A from its collapsed position to its expanded position shown in FIGURES 1 and 3, respectively.

A locking element L in the form of a cup shaped cap 35 is slidably mounted on the lever 25. A coil spring 36 is also mounted on the lever 25 between the cap 35 and a washer 37 retained on the lever by a pin 38 passing through the eye 39 of an attaching hook 40 mounted in a slot 41 formed by bifurcating the outer end of the lever 25. A fishing line 42 of a suitable flexible construction is adapted to be detachably secured to the hook 40 for use in the operation of the device which will be later described.

The spring 36 co-acts with the cap 35 to retain the cap in either the releasing position against the side of the body B as shown in FIG. 1, or the locking position shown in FIGURE 3 wherein the cap 35 fits freely over the end of the body B to prevent movement of the actuator A from its alined position shown in this figure, so as to positively maintain the arms 12 in expanded position.

In the operation of my attaching device, a connector C of a standard manufactured construction is in the form of an open ended tubular body 50 having helical lugs or screw threads 51 of the same pitch as the helix of the wound type of flexible metallic electric conduit E so as to enable the connector to be screwed tightly into the end of the conduit until an external annular flange 52 adjacent to the screw threaded nut-receiving portion 53 of the connector tightly abuts the conduit.

Let it be assumed for example, that the conduit E is to be installed in a closed wall to extend from a location beneath the floor to an opening cut in the wall for a receptacle. A hole of sufficiently large diameter to freely admit the conduit is first drilled through the floor plate from below the floor so as to open into the wall space directly beneath the wall opening. The line 42 which may be in the form of an easily manipulated ball chain (not shown) is lowered through the wall opening and fished through the hole in the floor plate.

The attaching device as above described is now or has previously been inserted through the connector C of the conduit E and then expanded and locked by the element L in expanded position as shown in FIGURE 3. In its expanded position the arms 12 of the body B have been forced radially outward by the cam 22 a sufficient distance for a circle defined by the peripheries of the projections 13 of the arms 12 to exceed the inside diameter of the connector C so that the projections will engage the annular shoulder formed by the inner end 57 of the connector when a pulling force is exerted upon the actuator A by the line 42 attached to the hook 40 as shown in FIGURE 3.

It will be noted from FIGURE 6 that the upper end of the rod 20 abuts the stop 16 of the tube 10 so as to transfer the pulling force of the line 42 from the actuator A to the body B and prevent further expansion of the arms 12 by the cam 22 beyond the elastic limit of the material. It will also be noted that the outer peripheral portions 55 of the arms 12 and the outer peripheral portion 56 of the head 21 are beveled so as to be reduced in diameter at their free ends in order to facilitate insertion of the attaching device into the connector.

The pulling force upon the line 42 is continued to draw the conduit E upwardly through the wall space until the conduit has reached the wall opening and can be conveniently grasped. The arms 12 of the attaching device are now collapsed to free them from the connector C and the device removed from the conduit, after which the screw threaded portion 53 of the connector is inserted in a knockout opening in the bottom of a wall receptacle to be installed, followed by screwing of a nut N on the portion 53 of the connector to rigidly secure the conduit to the receptacle R which latter may now be fastened in place in the wall in the usual manner.

I claim:

1. An attaching device comprising: a body having a plurality of attaching members movable from a collapsed position for insertion into a flexible conduit to an expanded position wherein said members are adapted to engage an internal shoulder in the conduit for pulling of the conduit through a wall space; and actuator mounted in the body for movement and having means co-acting with said members to move them to expanded position in response to movement of the actuator to one extreme position; an operating member movably connected to said actuator; said body and operating member having means co-acting to move the actuator to said extreme position in response to movement of the operacting member to a locking position; locking means co-acting with said operating member and body to lock the operating member in said locking position so as to maintain the attaching members expanded; means by which a line is adapted to be secured to said operating member for a pulling operation upon the flexible conduit when said operating member is locked to the body; said operating member being a lever pivotally connected to said actuator for movement from a releasing position wherein the lever projects laterally from the body to a locking position wherein the lever is in alinement with said actuator; said locking means being slidably mounted on the lever; and a spring mounted on the lever to urge said locking means in a direction for the latter to lock the lever in said locking position when moved thereto.

2. An attaching device comprising: a body having a plurality of attaching members movable from a collapsed position for insertion into a flexible conduit to an expanded position wherein said members are adapted to engage an internal shoulder in the conduit for pulling of the conduit through a wall space; an actuator mounted in the body for movement and having means co-acting with said members to move them to expanded position in response to movement of the actuator to one extreme position; and operating member movably connected to said actuator; said body and operating member having means co-acting to move the actuator to said extreme position in response to movement of the operating member to a locking position; locking means co-acting with said operating member and body to lock the operating member in said locking position so as to maintain the attaching members expanded; means by which a line is adapted to be secured to said operating member for a pulling operation upon the flexible conduit when said operating member is locked to the body; said operating member being in the form of a lever pivotally connected to said actuator for movement from a releasing position wherein the lever projects laterally from the body to a locking position wherein the lever projects from an end of the body in alinement with said actuator; said locking means being a cup shaped cap, and a spring releasably retaining said cap in locking position in which an end of the body is received in the cap.

3. An attaching device comprising: a body having a plurality of attaching members movable from a collapsed position for insertion into a flexible conduit to an expanded position wherein said members are adapted to engage an internal shoulder in the conduit for pulling of the conduit through a wall space; an actuator mounted in the body for movement and having means co-acting with said members to move them to expanded position in response to movement of the actuator to one extreme position; an operating member movably connected to said actuator; said body and operating member having means co-acting to move the actuator to said extreme position in response to movement of the operating member to a locking position; locking means co-acting with said operating member and body to lock the operating member in said locking position so as to maintain the attaching members expanded; means by which a line is adapted to be secured to said operating member for a pulling operation upon the flexible conduit when said operating member is locked to the body; said body being provided with a bore in which said actuator is axially movable to a stop in the body, with said body being bifurcated at one end and having a cam thereon; said operating member being a lever having a tongue at one end extending into said bifurcated end of the body and into a bifurcated end of said actuator, with a pin pivotally connecting the tongue to the actuator; said lever having a surface co-acting with said cam to move the actuator to said extreme position in response to movement of the lever to its locking position wherein the lever is axially alined with said bore.

4. The combination as set forth in claim 3 wherein said locking means is a cup shaped cap; and a spring mounted on said lever and releasably retaining the cap in locking position in which the bifurcated end of the body is received in the cap.

References Cited

UNITED STATES PATENTS 1,996,068   4/1935   Hinderliter _____ 294—86.25
2,538,693   1/1951   Maisch _____ 294—93
2,824,577   2/1958   Grunsky.

EVON C. BLUNK, *Primary Examiner.*

RICHARD E. AEGERTER, *Examiner.*

R. D. GUIOD, *Assistant Examiner.*